(12) United States Patent
Mezaael

(10) Patent No.: US 12,085,398 B2
(45) Date of Patent: Sep. 10, 2024

(54) VALIDATION OF VEHICLE PRIOR TO ROUTE UTILIZATION

(71) Applicant: FORD GLOBAL TECHNOLOGIES, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 679 days.

(21) Appl. No.: 17/168,530

(22) Filed: Feb. 5, 2021

(65) Prior Publication Data
US 2022/0252413 A1  Aug. 11, 2022

(51) Int. Cl.
*G01C 21/34* (2006.01)
*G06Q 10/0631* (2023.01)
(Continued)

(52) U.S. Cl.
CPC ..... *G01C 21/3461* (2013.01); *G01C 21/3415* (2013.01); *G06Q 10/06315* (2013.01);
(Continued)

(58) Field of Classification Search
CPC ............ G01C 21/3461; G01C 21/3415; G01C 21/3602; G01C 21/3697; G01C 21/3822; G01C 21/3841; G01C 21/3848; G06Q 10/06315; G06Q 10/0635; G06Q 10/067; G06Q 50/30; B60W 40/00; B60W 50/00; B60W 2050/0005
USPC ... 701/533, 117, 1, 532, 410, 400, 411, 414, 701/423, 36, 408, 409, 23, 428, 425, 431, 701/22, 465, 31.4, 25, 416, 468, 123, 701/301, 420, 2, 300, 538, 439, 119, 26, 701/412, 450, 417, 70, 118, 426, 537, 701/418, 454, 3, 424, 48, 527, 516, 469, 701/93, 29.1, 41, 33.4, 438, 467, 45, 461, 701/29.3, 523, 120, 31.5, 446, 51, 24, 701/437, 28, 34.4, 522, 517, 540, 430, 701/455, 50, 29.6, 472, 421, 102, 19, 54, 701/415, 436, 32.4, 445, 96, 99, 526,
(Continued)

(56) References Cited

U.S. PATENT DOCUMENTS 9,650,042 B2   5/2017   Sujan et al.
10,222,229 B1  3/2019   Shum et al.
(Continued)

*Primary Examiner* — Anne Marie Antonucci
*Assistant Examiner* — Jodi Marie Jones
(74) *Attorney, Agent, or Firm* — Joseph Zane; Brooks Kushman P.C.

(57) ABSTRACT

A system receives a request for an identified vehicle to complete a task. The system determines at least one route usable to complete the task and access a database of vehicle data snapshots to obtain data snapshots for one or more portions of the at least one route. The system simulates travel over at least the one or more portions, for the identified vehicle, including comparing and evaluating vehicle characteristics of the identified vehicle against route characteristics of the one or more portions identified from the data snapshots to identify any risks that the identified vehicle may encounter over the one or more portions. Additionally, the system, based on the results of the comparing and evaluating, presents any risks identified as likely to occur when using the identified vehicle to complete the task and traveling over at least the identified portions.

20 Claims, 4 Drawing Sheets

(51) Int. Cl.
*G06Q 10/0635* (2023.01)
*G06Q 10/067* (2023.01)
*G06Q 50/40* (2024.01)

(52) U.S. Cl.
CPC ....... *G06Q 10/0635* (2013.01); *G06Q 10/067* (2013.01); *G06Q 50/40* (2024.01)

(58) Field of Classification Search
USPC ....... 701/451, 49, 29.2, 521, 115, 29.4, 422,
701/32.7, 514, 37, 413, 466, 34.3, 457,
701/29.5, 491, 519, 433, 435, 487, 302,
701/419, 114, 14, 32.3, 27, 65, 16, 432,
701/442, 448, 482, 515, 541, 71, 21, 500,
701/53, 103, 32.1, 429, 440, 494, 56, 58,
701/72, 101, 31.6, 32.5, 443, 484, 488,
701/518, 9, 10, 104, 32.9, 38, 44, 66, 97,
701/110, 122, 32.8, 34.2, 42, 490, 534,
701/55, 78, 87, 31.7, 32.2, 33.2, 434,
701/470, 501, 528, 57, 69, 82, 91, 92,
701/121, 31.9, 33.3, 33.7, 463, 520, 67,
701/76, 90, 11, 113, 30.2, 31.1, 33.1, 39,
701/452, 456, 105, 116, 29.7, 30.3, 30.6,
701/30.8, 326, 4, 427, 447, 458, 46, 507,
701/52, 75, 94, 98, 107, 111, 112, 20,
701/30.5, 30.9, 31.8, 33.9, 441, 459, 483,
701/508, 530, 539, 6, 74, 77, 83, 89, 108,
701/124, 33.6, 40, 444, 453, 474, 476,
701/478.5, 480, 493, 5, 502, 503, 536,
701/63, 8, 80

See application file for complete search history.

(56) References Cited

U.S. PATENT DOCUMENTS

| | | |
|---|---|---|
| 10,324,463 B1 * | 6/2019 | Konrardy ............. G05D 1/0278 |
| 10,486,709 B1 | 11/2019 | Mezaael |
| 2007/0225900 A1 * | 9/2007 | Kropp ................ G01C 21/3461 |
| | | 340/995.23 |
| 2018/0341895 A1 * | 11/2018 | Kislovskiy ............. G06Q 50/30 |
| 2019/0213902 A1 | 7/2019 | Bender et al. |
| 2019/0311077 A1 | 10/2019 | Watanabe et al. |
| 2019/0384870 A1 | 12/2019 | Shiraishi et al. |

* cited by examiner

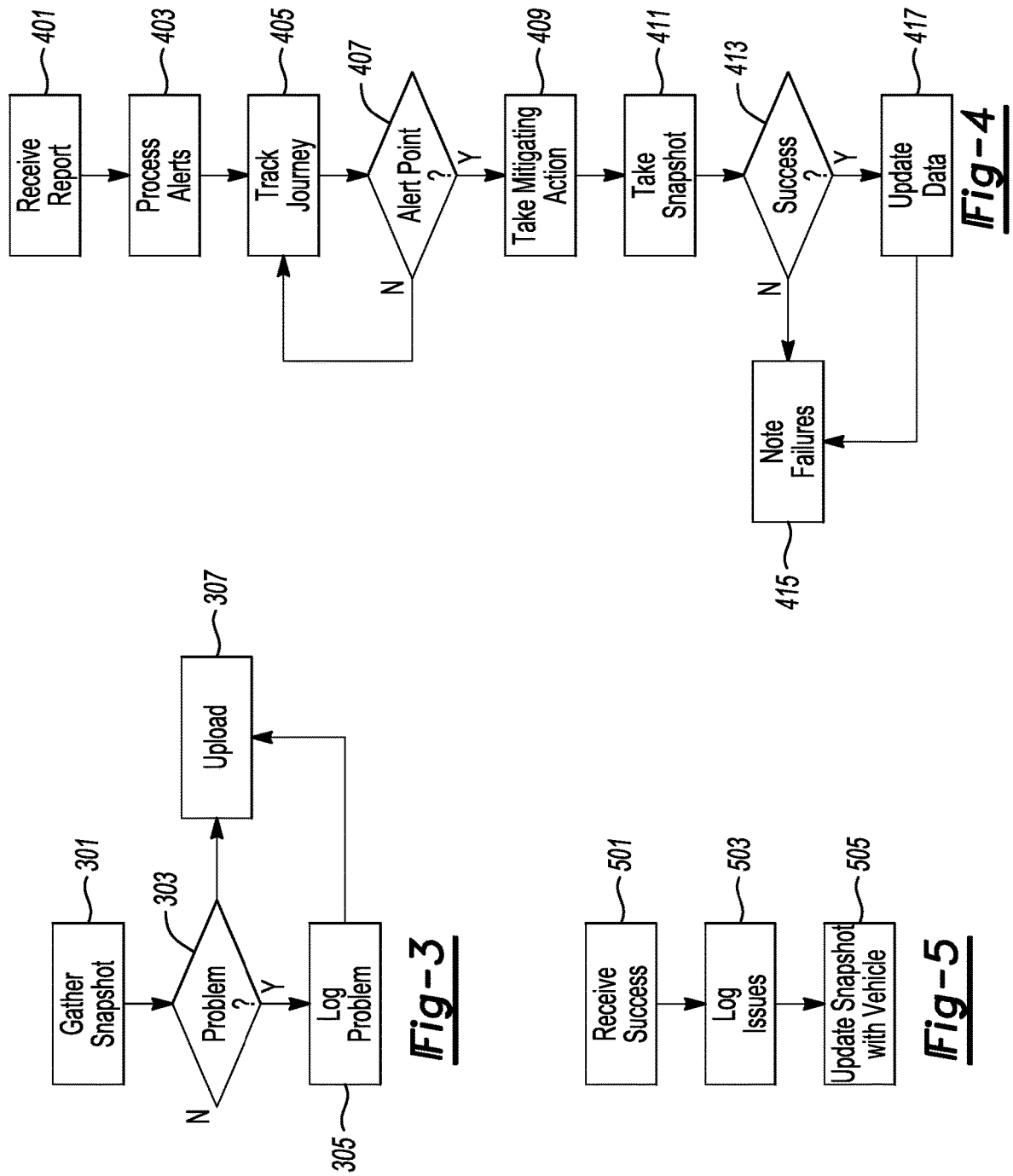

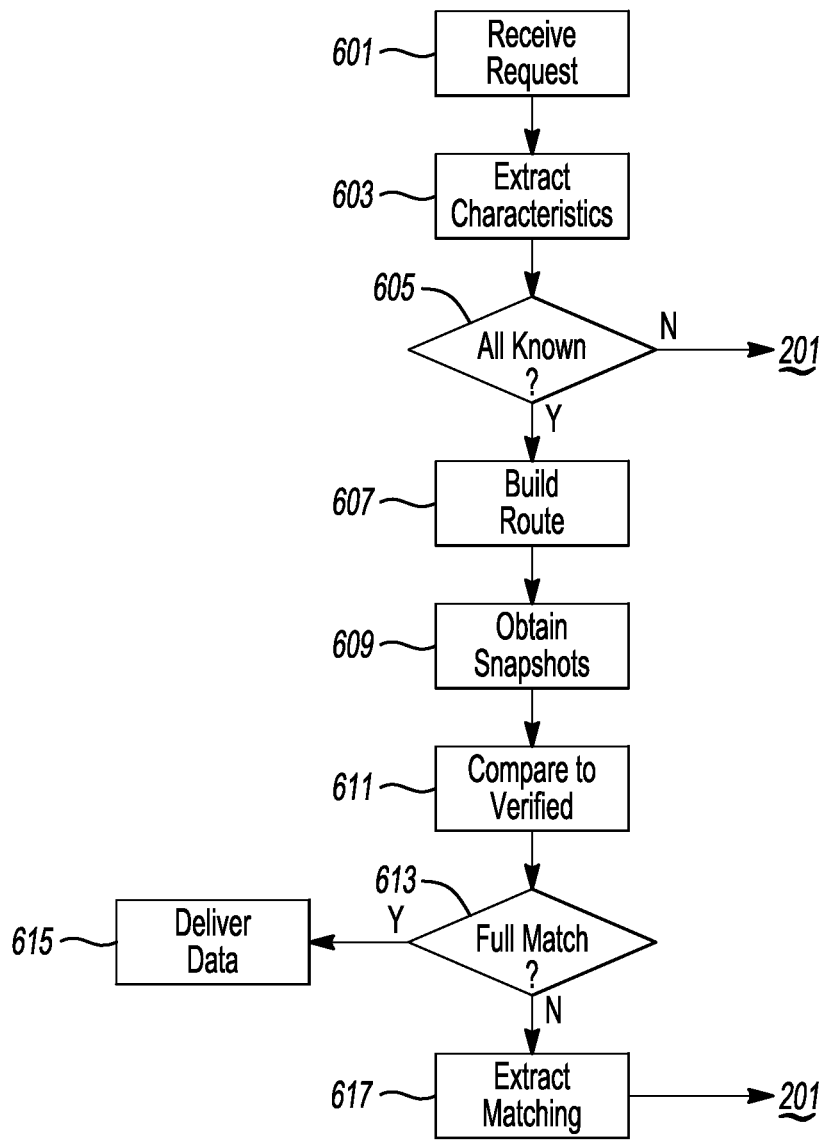

VALIDATION OF VEHICLE PRIOR TO ROUTE UTILIZATION

TECHNICAL FIELD

The illustrative embodiments generally relate to methods and apparatuses for validation of a vehicle prior to route utilization.

BACKGROUND

Many personally owned vehicles are used for the same tasks over and over, e.g., going to work, delivering children to school, etc. This allows the owner/user to select and purchase a vehicle that is going to be used for a series of known tasks, known in advance, and under a series of known conditions, known in advance. For example, a person living in northern regions may recognize that driving include snow/ice conditions, and if they have an hour-long commute, may elect to purchase an SUV, determined to be suitable for such conditions. A person in the same conditions who only has a 5 minute commute, however, may elect a sports-car, deciding that the limited distance driving in the wintery conditions is not sufficient to restrict the purchase.

On the other hand, fleet vehicles and autonomous vehicles (AV)s may be put to a variety of tasks, many of which are difficult to fully appreciate in advance. A fleet may be repurposed for a secondary or new task, and autonomous vehicles may be expected to attempt virtually any sort of requested drive. This makes it much more difficult to plan exactly what the vehicle will be doing. Most fleets, including AV fleets, will have a variety of vehicle-types available to them, however, which may provide at least some flexibility in dispatch of vehicles.

SUMMARY

In a first illustrative embodiment, a system includes a processor configured to receive a request for an identified vehicle to complete a task. The processors are also configured to determine at least one route usable to complete the task and access a database of vehicle data snapshots to obtain data snapshots for one or more portions of the at least one route. The processors are further configured to simulate travel over at least the one or more portions, for the identified vehicle, including comparing and evaluating vehicle characteristics of the identified vehicle against route characteristics of the one or more portions identified from the data snapshots to identify any risks that the identified vehicle may encounter over the one or more portions. Additionally, the processors are configured to, based on the results of the comparing and evaluating, present any risks identified as likely to occur when using the identified vehicle to complete the task and traveling over at least the identified portions.

In a second illustrative embodiment, a system includes one or more processors configured to receive a request to complete a task, the request including one or more parameters associated with the task. The processors are configured to determine a specific vehicle, from a plurality of available vehicles, to be used to complete the task, based on vehicle characteristics correlated to the one or more parameters and indicating that the vehicle is suitable to accommodate the one or more parameters. Further, the processors are configured to determine at least one route usable to complete the task and access a database of vehicle data snapshots to obtain data snapshots for one or more portions of the at least one route. The processors are additionally configured to simulate travel over at least the one or more portions, for the specific vehicle, including comparing and evaluating vehicle characteristics of the specific vehicle against route characteristics of the one or more portions identified from the data snapshots to identify any risks that the specific vehicle may encounter over the one or more portions and, based on the results of the comparing and evaluating, present any risks identified as likely to occur when using the specific vehicle to complete the task and traveling over at least the identified portions.

In a third illustrative embodiment, a method includes receiving a request for an identified vehicle to complete a task. The method also includes determining at least one route usable to complete the task and accessing a database of vehicle data snapshots to obtain data snapshots for one or more portions of the at least one route. Additionally, the method includes simulating travel over at least the one or more portions, for the identified vehicle, including comparing and evaluating vehicle characteristics of the identified vehicle against route characteristics of the one or more portions identified from the data snapshots to identify any risks that the identified vehicle may encounter over the one or more portions and, based on the results of the comparing and evaluating, presenting any risks identified as likely to occur when using the identified vehicle to complete the task and traveling over at least the identified portions.

BRIEF DESCRIPTION OF THE DRAWINGS

FIG. 3 shows an illustrative example of a snapshot update process;

FIG. 4 shows an illustrative example of a mitigation and model update process;

FIG. 5 shows an illustrative example of another snapshot update process; and

FIG. 6 shows an illustrative example of another simulation process with an illustrative efficiency component.

DETAILED DESCRIPTION

Figure 1:
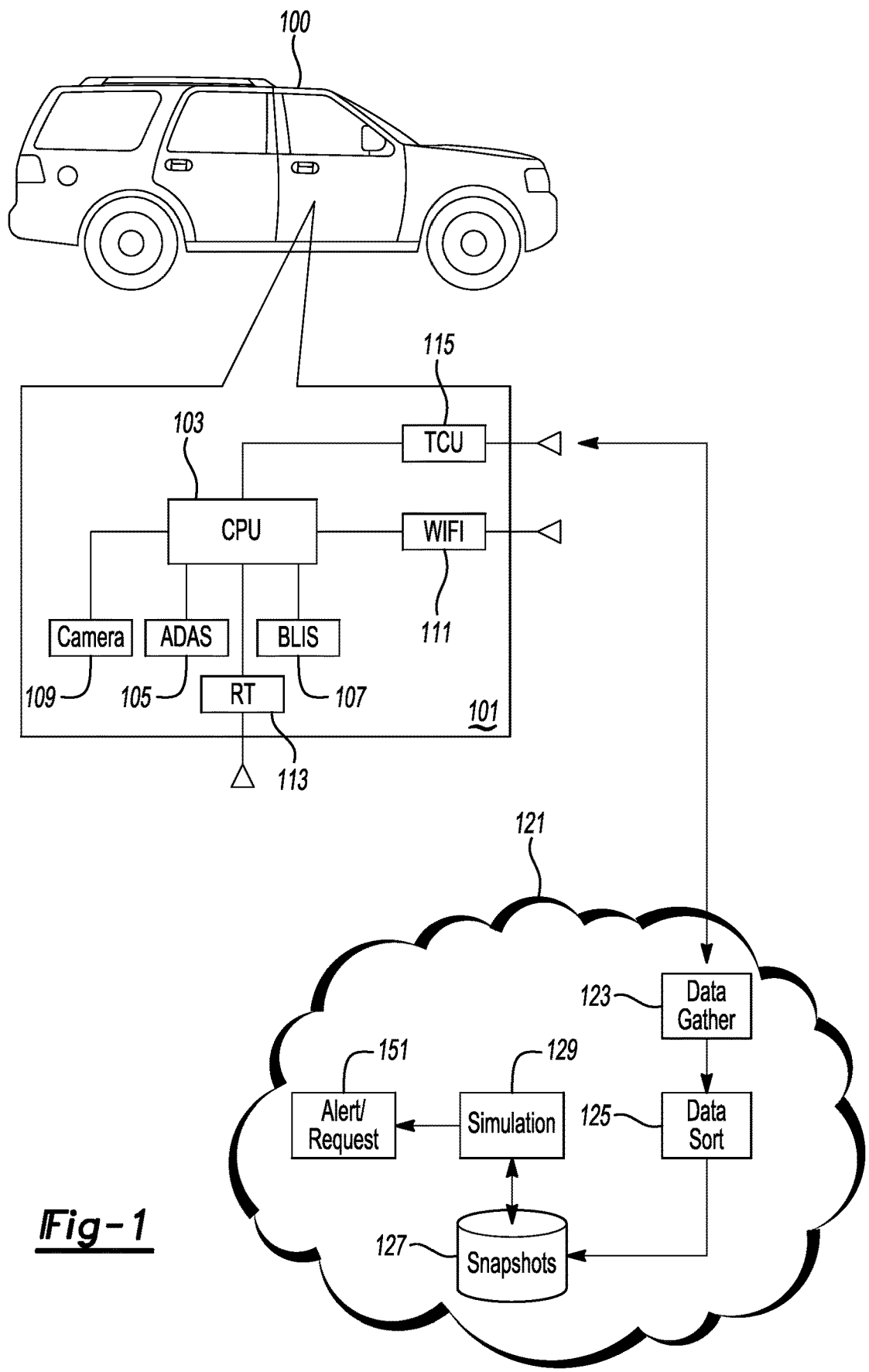
FIG. 1 shows an illustrative example of a vehicle data snapshotting system and simulation processes.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Autonomous vehicles may be automatically tasked with certain service fulfilment, such as passenger pickup, package delivery, etc. These tasks can carry the vehicle 100 through a variety of conditions and terrain, as well as utilize differing vehicle systems and capabilities, and it may be prohibitively expensive to build a single vehicle that can perform every required task.

Even if there is no universal AV, various members of an AV fleet may be capable of performing a variety of tasks. Since tasks are not always routine in nature (e.g., picking up a passenger in a narrow alley may require a different vehicle than picking up a passenger on a snowy mountain), the mere purposing of a vehicle 100 as a "passenger pickup vehicle" may be insufficient. At the same time, in a fleet of ten different vehicle types, three may be able to perform the first task and two the second. Since the conditions encountered by a vehicle 100 may often be destination or route related, as opposed to task related (e.g., does the vehicle have seats for passengers), each route and destination may have to be considered before sending a vehicle 100 to complete a task. This can help avoid situations like putting a vehicle 100 lacking four-wheel drive in a highly slippery condition or sending a vehicle 100 with a poor active suspension over very rough terrain whilst carrying a fragile load.

The illustrative embodiments propose a pre-route simulation or other similar check that verifies that a possible candidate vehicle 100 is sufficiently equipped to handle a proposed task. Since this similuation or check may benefit from a variety of information that is not traditionally avaialble about a locality through conventional data sources, vehicle data snapshots may play a useful role in helping determine exactly what a vehicle 100 will encounter on a given task assignment.

The illustrative embodiments allow for use of vehicle sensors to capture vehicle data snapshots. Examples of the concept of data snapshots are generally described in co-owned and co-assigned U.S. Pat. No. 10,486,709, filed on Jan. 19, 2019 and granted on Nov. 26, 2019, the contents of which are hereby incorporated by reference. Generally speaking, without limtiation, a vehicle data snapshot includes data and events detected by various vehicle sensors, that may include, but which are not limted to, control sensors, cameras, LIDAR, RADAR, user inputs, wireless communciaiton systems, etc.

Useful for determining instantaneous, short-lived, long-lived and permanent travel-affecting instances at a specified location, the data snapshots can be used to more accurately model portions of a planned route or re-route to real conditions. For example, a temporary construction barrier may limit the width of a street to six feet, which may only allow certain vehicles to pass. Other vehicles would have to be routed around this region, or could not perform a pickup or delivery within the region, but conventional map data may not indicate the presence of the barrier.

Snapshots may also indicate the presence of many animals or children or other obstructions that may limit the choice of vehicle or load, as well as require that the vehicle 100 have sufficient reaction time and sensing capability to react to unexpected obstruction occurences. For example, a truck with a long braking distance may be unsuitable in an environment where many temporary obstacles (people, animals, rocks) may be present and a vehicle 100 with faster braking may be chosen.

Road grades and slipperiness may also not appear on map data, and over-heavy vehicles or vehicles prone to slippage or tipping may not be suitable for certain routes and/or at certain times under certain conditions. Vehicle data snapshots taken by other vehicles at a given location can indicate the presence of a number of instances that might need to be contemplated when doing such an analysis, and together these snapshots may form a very complete picture of a route from a additional-considerations perspective.

While useful for AVs, such snapshotting and simulation/testing data may also be useful in a variety of other situations. For example, fleet managers may use the simulations and testing to determine which fleet vehicles are suitable for undertaking a specific or common task, and the modeling can be run dynamically whenever a vehicle that has not previously been used for a task is contemplated for use. Even if a vehicle has been previously used, changes in conditions may warrant running the modeling whenever a vehicle is assigned a task or at regular intervals.

The simulations and testing may also be used by engineers designing a vehicle, to determine if the vehicle 100 can adequately navigate and be utilized in the types of conditions for which it is being built. This may be even more useful if autonomous vehicles are designed with specific purposes in mind, so that an alleged multiple-capability vehicle can be confirmed for expected usage conditions under a variety of tasks for which it is sold. Because the snapshot data may reflect real world data, it may reveal situations that are difficult to simulate on a track environment, and if a vehicle computer and/or cloud computer can "run" a vehicle through a variety of real world scenarios to see how computing systems respond (even if physical systems cannot be explicitly tested in such a manner, although that is by no means excluded from the concepts herein), better data on the utility of various computing system functions can be obtained. The data and simulation may also better define which track scenarios may benefit from real-world modeling, wherein a track can be set up to confirm that a vehicle 100 will or will not do something as indicated by the data. That data, in turn, can be fed back into the modeling for that vehicle with those systems, so that future testing can reflect the real-world results, and so on.

Dealerships may also be able to run simulated route data for vehicles being sold, so that a customer may define, for example, common routes and driving regions, and the dealer system may be able to confirm whether a chosen vehicle is suitable, or which vehicle performs the best under the expected travel localities and conditions. This can help a customer to choose from a variety of vehicles and features, and to predict a real impact that adding an option or removing an option may have on actual expected performance, including whether a vehicle will even do what it is intended to do without certain options.

Similarly, car rental services may offer such simulation, which can also be run in advance of a rental and be used to assign correct vehicles to renters based on intended use, even within the same class of vehicle. Renters can experience a better rental process and user experience as a result, which can also help diminish unexpected accidents and vehicle malfunctions.

Simulation can include, but is not limited to, running data through all vehicle modules that reflects the data that module would receive in real life. This is achievable in at least one instance because such data may be contained in the data snapshot. Thus, the data can be an example of, or modeled after, the literal data received by the vehicle taking the snapshot at the moment when the snapshot was taken. So, for example, even if a sensor does not actually sense anything because there is nothing to sense, at least certain capabilities of the sensor system can be tested by feeding the data into the sensor processing as thought the sensor had sensed the data. This can also reveal how various electronic control units (ECUs) and vehicle modules will react to the occurrence of certain data, and whether a system for gathering data needed to avoid an instance (e.g., an ADAS avoidance system and accompanying sensors) is even present.

Vehicle data snapshots may also reveal failures experienced in the real world based on certain ECU and system reactions, and the simulation can help ensure that the candidate vehicle does not have the same, ultimately undesirable, action projected to occur.

Modeling can also indicate clearances both above and to the sides of the vehicle, and even below the vehicle, to ensure that the vehicle (which will not strike a simulated obstacle) would not actually strike the obstruction were it present. In this manner, even physical traits of the vehicle can be verified by processes actively monitoring the physical conditions and applying the physical characteristics to those conditions, even if there is not a specific ECU or module that represents the width of the vehicle, since that is a physical trait.

FIG. 1 shows an illustrative example of a vehicle data snapshotting system and simulation processes. In this illustrative example, vehicle 100 is a fleet vehicle that may include a variety of onboard sensor and communication systems 101 that allow for data snapshotting and sharing. These systems may vary by vehicle 100, but may be included in all types of vehicles, not simply fleet vehicles. If a vehicle owner grants permission, for example, all gathered data from that vehicle may be sharable with a variety of interested parties. The data could have any identifying information scrubbed therefrom, and in this manner a vast number of vehicles 100 can work in conjunction to gather and share data via vehicle data snapshots. Even if a vehicle 100 lacks certain sensors provided to another vehicle, any data gathered by that vehicle 100 may be useful in the aggregate to form a more complete set of information relating to areas in which that vehicle 100 has traveled.

In this example, the vehicle 100 includes a processor 103, that communicates with a variety of onboard sensors, systems, processes and communication connections. These include, for example, an adaptive driving assist system (ADAS) 105. ADAS can include a wide variety of systems such as, but not limited to, adaptive cruise control, anti-lock braking, heads-up displays, night vision, collision alert and avoidance, drowsiness detection, stability controls, lane centering and departure warning, rain sensors, traction control, etc. While not all of these systems include data recording or are designed to explicitly record data, some may include data recording and with others, the fact that a system was engaged (e.g., lane departure, fraction control, etc.) can be indicative of an occurrence of a reason to engage the system, which can add to the inferable information about a location at which a data snapshot was taken.

Blind spot information systems (BLIS) 107 often include cameras and sensors that can sense sideward and rearward traffic, as well as low-lying front obstructions in some newer vehicles. This information can also be used in data-gathering, as these cameras and sensors can record and share data even if the system itself is not triggered for the purpose of an alert for a current driver. Other vehicle 100 cameras 109 can also be used to capture data, and these can include LIDAR systems and other camera based data gathering systems that may have an alternative primary purpose, but which may be utilized in a data snapshot to gather instantaneous information.

The system 101 may also include, for example, Wi-Fi communications 111, BLUETOOTH communications 113, and one or more telematics control units (TCU) 115. These communications systems can serve to share data about vehicle data snapshots, as well as be used to gather data in certain instances. For example, a Wi-Fi transceiver 111 onboard the vehicle 100 may be used to detect the presence of networks, which can be useful for determining the existence of a certain business based on a network name.

As the vehicle 100 gathers data snapshots, it can transmit the information to the cloud 121, which may include various post-processing and analysis software, as well as data repositories. In this example, a data gatherer process 123 in the cloud 121 serves to receive the data from the vehicles 100 that gather data snapshots as they travel. This data may be passed to a data sorting process 125, which can isolate data elements and characteristics for categorizing a data snapshot, to render the snapshot useful in later simulations that use the data.

So, for example, if a current data snapshot including image data shows a vertical bar-like structure extending a certain distance, that may be characteristic of a lamp-arm as may be known from other data snapshots that have been verified. The current data snapshot could be used to estimate the height of the lamp arm based on the location of the arm relative to a known location in the vehicle of the camera, and this could serve as a guess at the presence of an obstruction at, for example, 10 feet above the road. Or, if the lamp arm visually matched other lamp arms in similar proximity (from other local snapshots), and the installation of all lamps was standard or projected to be standard, the known characteristics of the other lamp arms (e.g., 2 feet out from curb, 10.7 feet off the road surface) could be applied to the current data snapshot.

Similarly, temporary obstructions such as physical road barriers and other objects may appear in the snapshots and define a new width for a road, or terrain that must be dealt with by a vehicle, and which may not appear in map data. Even if map data indicated construction, it will likely not include the passable width for a vehicle 100.

Vehicles that are dispatched after running a simulation data may also continue to take snapshots, both of new locations and of previously encountered locations (data reflected in other snapshots used to create the simulation). The latter can be useful to determine if the model based on the data is correct, i.e., did the vehicle 100 perform as expected under the conditions modeled based on the previously obtained snapshot. If the vehicle 100 does accommodate any instances of interest represented by the data, this fact can be updated to verify the model, and if the vehicle 100 encounters any issues, this fact can also be updated to modify the model based on the nature of the issue encountered by the vehicle.

The cloud in this example includes a database 127 of data snapshots. These can be accessible based on geographic locations where they were taken (e.g., coordinate data) and/or can be accessible as examples of what a given vehicle 100 could or could not do. That is, if the vehicle 100 encounters difficulty at one location, and takes a snapshot, similar characteristics in another location may predict similar difficulty, so even data that is not on the exact route to be taken may be useful for the simulation and analysis. The database 127 may store a vast number of already-captured snapshots that can be used to build a simulation or other verification process.

The simulation process 129 can access data snapshots for areas of a route in question, as well as data indicating how a candidate vehicle performed under comparable conditions, which can be useful in verifying or fast-checking compatibility with a snapshot location along a route. The simulation can build a series of inputs and verification tests that allow the vehicle to run through a simulated route without moving. While the route may not encompass every location, many locations along a route may be in database 127 as snapshot. Also, certain areas of the route may be ignored in the simulation process 129 if desired, such as areas where there is a long stretch of unimpeded travel and wide roads, where virtually any vehicle 100 can travel.

In at least one instance, the selection of data may be based on characteristics of the vehicle 100 that may be known to create or solve issues. For example, a vehicle lacking traction control may have a simulation that includes all data snapshots that have data indicating that traction control (on the snapshotting vehicle) was engaged. This could be used to model reasons or the need for traction control, and measurements taken by the snapshotting vehicle may determine the reasonableness of a vehicle 100 lacking traction control encountering the same situation.

Data in the database 127 may also represent temporary conditions, such as weather or other factors that do not persist. Thus, multiple snapshots for a location may be considered, to model out the maximum number of modellable parameters projected to be occurring when a vehicle 100 encounters the area. For example, one snapshot may be robust with regards to permanent conditions, having been gathered by a vehicle with excellent sensors. Another very recent snapshot may indicate the likely presence of rain, but the vehicle gathering that snapshot may not provide much additional useful information. A third snapshot taken during similar rain, at a prior point, by a third vehicle may provide better information for modeling the conditions that occur at that location when it is raining. Data indicative of present conditions may be temporarily retained and discarded if it does not contain information of additional value over comparable data snapshots of the same location that include more information.

In addition to simulating the vehicle travel experience, the cloud 121 may include an alert/mitigation process 131. This can include recommendations or instructions to the vehicle 100 to engage or disengage certain systems at certain locations where the existing data snapshots and simulation indicate such a change would be useful. Further, the process 131 may include alerts for driven vehicles that may be useful in situations where the simulation may indicate that care need to be taken with a given vehicle 100 at a given location. The alerts and mitigation instructions may also request that the vehicle 100 take a snapshot at each such location, so the ultimate success or failure of adhering to the instructions or alerts or recommendations can be later contemplated and integrated into the model. These and other snapshots may be passed back by the vehicle 100 to the cloud 121 so that various simulation modelling strategies can be accommodated and adapted to observed occurrences at the simulated locations when the vehicle 100 actually reaches such a location. In some instances, the vehicle 100 may be instructed or asked to snapshot at least every location that was modeled, for such purposes, and may also be instructed or asked to include at least some number of additional data points to build out the database 127.

Figure 2:
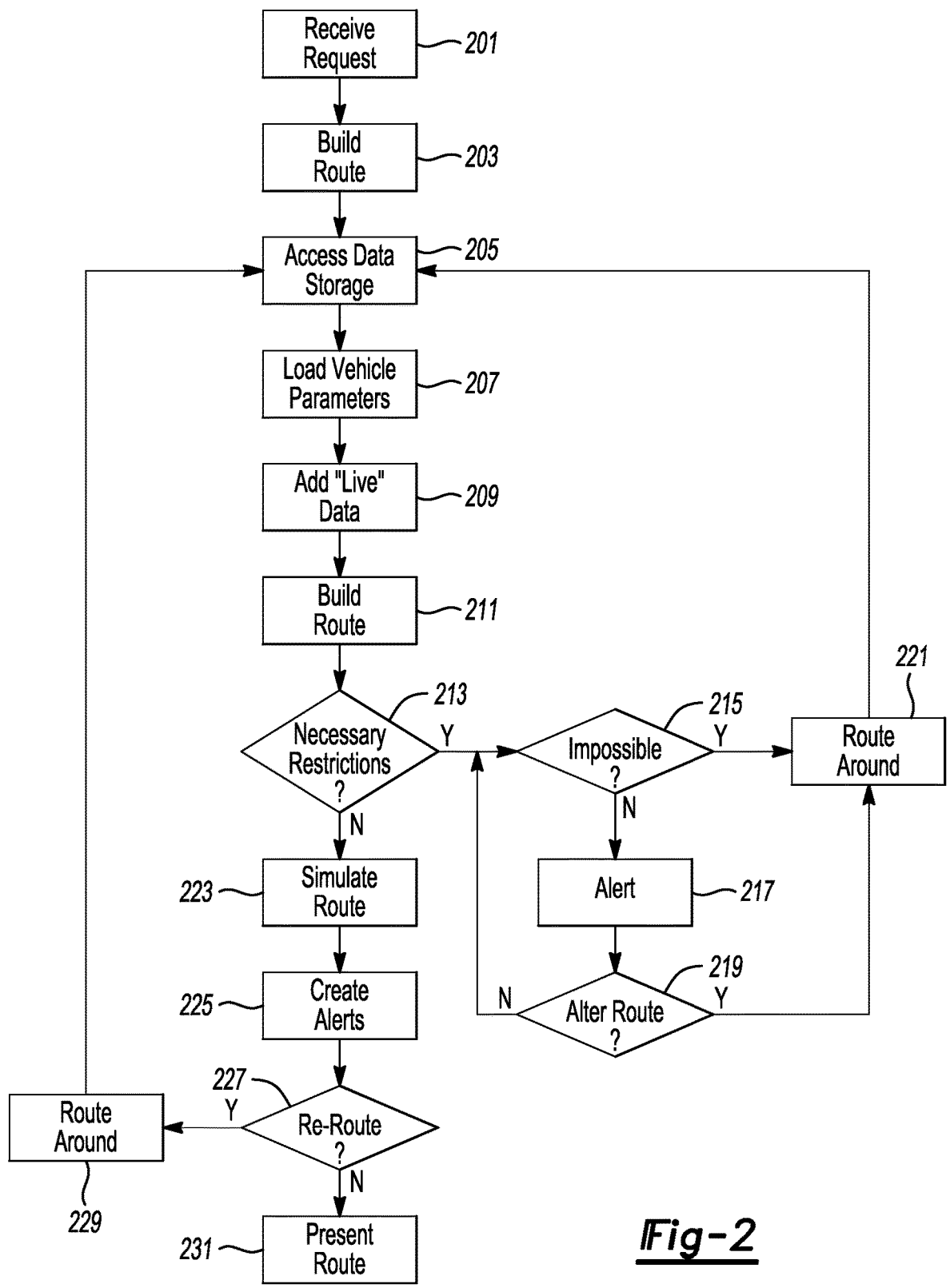
FIG. 2 shows an illustrative example of a simulation process.

FIG. 2 shows an illustrative example of a simulation process. In this example, a process 129 receives a request to build a simulation at 201. This process 129 can executed on a local computer, in a vehicle computer or in conjunction with a vehicle computer, or in the cloud 121 as shown. The request may define a task to be completed, and may include parameters of the task, such as load size/weight, expected passengers, passenger needs, special needs (e.g., fragile load, small child being carried), cargo needs, etc. The parameters may be used to select an initial group of candidate vehicles 100 from a larger group of possible fleet vehicles, or may be responsive to a user request. For example, if a user purchased a vehicle 100 and wanted to know if it could handle pulling a trailer to a specified destination, for example, the same simulation process may be requested by an individual and results could be delivered to a computer or to the vehicle 100 directly.

Additionally, the simulation may include a VR component if desired, wherein a user can see a virtual representation of at least certain areas of the route that may be of interest (e.g., without limitation, sharp curves, tight squeezes, etc.). Since the user may not want to sit through a simulation of the entire route, the simulation process 129 may have parameters defining which portions of the simulation are suitable and interesting for re-creation in VR.

In response to the request, the process 129 may build one or more proposed routes at 203. This can initially include a preferred route but may also include alternatives to portions of the route, and may be built based on parameters included with the request as well (e.g., no speeds over 45 mph, limited graded hills, etc.). Once a route has been established, the process 129 may access the database 127 at 205, to obtain a variety of data snapshots that correlate to portions of the route, as well as any supplemental snapshots, as previously noted, for a given location on the route.

The process 129 may also load the parameters for one or more candidate vehicles at 207, which can include vehicle systems as well as sensor inputs. These parameters may also include adjustments based on the request, which can indicate, for example, load characteristics, passenger characteristics, etc., which may be variables that are not part of a stock vehicle 100 configuration, but which may still be useful in the simulation to model projected reactions to various conditions.

Also, in this example, the process 129 adds any live available data at 209, this includes, for example, weather, traffic and other temporary instances expected to be encountered by the vehicle 100, which may also require access to different or alternative data snapshots. This data may come from a variety of sources and is not limited to data snapshots, when a better or more accurate source of current or projected (at the time of arrival at the location) data is available.

The simulation process 129 then builds a simulated route, including simulations of the various locations represented by the data snapshots at 211. Even if data snapshots are available for every location on the route, depending on computing needs and overhead requests, the simulation may limit the route to areas where the data indicates the vehicle 100 may have an issue. Which vehicles 100 may encounter issues may be dependent on the vehicle parameters as well, so different data snapshots may be chosen for the route for different vehicles (e.g., a short vehicle may ignore data that only has a clearance characteristic and no other characteristics of interest, but that same data may be used for the same route if a different candidate vehicle is over 10 feet tall or 10 feet tall when loaded).

One or more data points may indicate a necessary restriction at 211, which can be an immovable object, a narrow passage, a fixed sharp turn, etc., rendering it impossible for certain candidate vehicles 100 to traverse that point. If the data indicates any fixed parameters that would render certain vehicles 100 unsuitable at 211, the process considers at 213 whether the current candidate vehicle 100 can even pass that point. If the decision of impossibility is made, the process 129 may still consider the candidate vehicle (especially if it is the only possible choice, or the best possible choice for the remainder of the route), but the process 129 may route around the point at 219, and any other points indicating similar impassibility, and then return to simulating the new route.

If there is no impassible scenario, the process 129 may still generate an alert at 215 that notifies the driver or AV of the necessary restriction, and the requestor may determine if the process 129 should alter the route or not at 217. For example, if a vehicle is 6 feet wide and the necessary restriction is 6 feet 3 inches of passage, the requestor may not want to risk damage to the vehicle 100, even though the vehicle 100 can pass. In a same manner, AV fleet managers may prefer that the AV not risk collision or passage through a tight space, even if it can technically fit.

Even if the route is not altered, the alert may be passed to the vehicle 100 and the vehicle 100 upon passing the alert point can snapshot the data to confirm the necessity of the alert and whether the necessary condition still persists.

The process 129 then simulates the route at 221, feeding the relevant data into vehicle ECUs and systems as the vehicle simulates passage through each portion of the route simulated by the data. This can be used to confirm, for example, whether sensors or post-sensing processing generates the desired response, whether the vehicle 100 engages or disengages optional systems as it should in response to the data, and whether any systems deemed necessary appear to be missing or malfunctioning on the candidate vehicle 100.

As the process 129 simulates the route through the various simulated locations generated using the data snapshots and other data if desired, the process 129 may create alerts at 223, which can include situations where the vehicle 100 is confirmed to function as intended, but where a reported system value may be within a threshold of a tolerable limit and so a driver may want to take care in that situation or an AV may want to choose another route or drive over-cautiously.

Alerts may also represent situations where a vehicle system state needs to be changed to mitigate risk represented in the simulation, such as slowing below a speed limit, engaging or disengaging an optional system, etc. Not only can a driver or a vehicle 100 react to these situations by performing a recommended or instructed action, but the alert states can also request updated snapshotting of the location to confirm the necessity or appropriateness of the alert. Such data can improve alerting in general and for the specific locations.

If any alerts result in a desire to route-around a region at 225, the process 129 may create a new route at 227 and re-run the simulation for the new route with additional data snapshots along the new segment(s). Otherwise, the process 129 may confirm and present the route at 229, along with the approved candidate vehicle 100.

If the process is semi-automated or automated, e.g., a computer receives route parameters and then chooses and dispatches a vehicle 100 after confirming the simulation, the route presentation may include sending the route and any alert/mitigation instances to the vehicle 100. In such instances, a decision to re-route may be made by the computer whenever an alert occurs or whenever an alert of a certain predesignated riskiness occurs (e.g., variable or system reaction within X % of a predefined tolerable threshold). In other situations, a human decision maker may make a decision to route around one or more locations for which an alert was presented.

FIG. 3 shows an illustrative example of a snapshot update process. In this example, the vehicle 100 gathers a data snapshot at a location correlating to either an alert or a previously gathered location that was used in the simulation. The instructions to gather the snapshot may be included in route data that is sent to the vehicle 100, and may include the locations of some or all data snapshots used in the simulation so the vehicle 100 knows when to gather a new snapshot.

If the data gathered indicates a problem at 303, the process may log the problem at 305 and then, in either instance, upload the data and the problem, if any, at 307. Because the data can include instantaneous values of various system states, as well as vehicle sensors, whether or not the vehicle 100 is reacting as anticipated in the simulation can be achieved by comparing the various state values to those resulting from the simulation. This can be done onboard (if the vehicle 100 has the base expected state values) or in the cloud after delivery of the new snapshot. That data may improve modeling in terms of both simulating a condition and determining a state reaction.

Since a vehicle 100 sensor or state subjected to a simulation may simply respond how it responds to the data, the simulation may have to be modified to elicit the response that is actually experienced at the time of actually encountering the location. Additionally, some vehicle 100 state values included in the snapshot may serve as inputs for other systems in the simulation, and so those state values will be simulated. For example, a prior data snapshot may indicate a roll value that is demonstrated to be inaccurate with later data for the same location, and so the new data may be used to simulate the roll value at that location (as opposed to physically tilting the vehicle to generate the response from a roll sensor).

The changes to the data may affect other vehicles 100 presently on the road, and so the backend process can re-simulate any locations which have had changed values or to which updated models apply. This can result in a distribution of updates to those vehicles 100, which in an extreme may cause a re-route or route termination if the new data indicates an impassible or undesirable occurrence based on the re-run simulation. In other instances, new alerts may be generated for those vehicles 100 and/or modified mitigation actions may be generated and distributed.

FIG. 4 shows an illustrative example of a mitigation and model update process. In this example, the process executes onboard a vehicle 100 that is traveling, either autonomously or under the control of a driver. In the examples, an alert action or mitigation action may be described as recommended, although it will be appreciated that this could equally be an automatically executed action based on an instruction as opposed to a recommendation, whether the vehicle is autonomous or human-driven. Even an autonomous vehicle may simply receive "recommendations" and then whether the vehicle 100 acts will be a function of the onboard programming, of which the simulation process 129, generating the alert and/or recommendation, may not be aware or capable of accommodating.

The vehicle 100 receives the report from the alert and recommendation process 133 at 401. The vehicle 100 extracts any alerts at 403 and takes any configuration steps dictated by any recommendations as they apply to that vehicle 100. Then, as the journey begins, the vehicle 100 begins tracking the journey at 405, which can include gathering periodic and/or random data snapshots to be used in analysis and/or to increase the data available to database 127. If the vehicle 100 encounters an alert point at 409, an illustrative series of steps may be taken as described.

As noted, at some alert points there will be a preferred mitigation action to be taken, which can include engaging or disengaging a vehicle system or slowing, accelerating, etc. Any suitable mitigation recommendation may be addressed by the vehicle 100 or a driver prior to reaching the situation or as the data indicates is appropriate at 409. The vehicle 100 also takes a fresh snapshot at the alert location at 411, in order to provide refreshed data to the backend and to help analyze whether the vehicle 100 is reacting as projected by the simulation.

If the vehicle 100 successfully navigates the location and performs as expected at 413, the process may update the remote system at 417 with an indication that the model simulation predicted the behavior correctly and that the vehicle 100 successfully passed the location. If the vehicle does not successfully navigate the location or if data is outside expected values for one or more vehicle systems or sensors, the process may note any failures or unexpected values at 415 and report those to the backend system at 417.

Whether success or failure occurs, the data may be useful to validate or improve the simulation process, and immediate data snapshots can also improve the data repository data store.

FIG. 5 shows an illustrative example of another snapshot update process. Upon receiving at 501 the updated data from the vehicle at 417, the simulation process 129 or another process may analyze the data and note any issues at 503. These are not necessarily problematic issues from a success standpoint, but may also simply be unexpected system or state variable values that were outside of projections for the given instance. This can help improve the model for future simulations.

Also, in this example, the process updates metadata associated with at least one data snapshot for the location, that indicates that this vehicle 100 successfully navigated the location under the current context. The context can include, for example, total weight, load parameters, environmental parameters, etc. This data can then be used for future decisions about whether that vehicle under that context can travel through that location (or a similar location) without having to actually simulate the location. This may be especially useful for fleet managers who frequently dispatch vehicles through the same locations, but who may have varied vehicles available at any given time. Other similarly outfitted vehicles may also be expected to have similar results, and such instances of success can save processing overhead if the data point can be excluded from a simulation (if desired), based on a determination that the context will likely match and therefore the vehicle 100 should be able to navigate the location again under the matching context.

FIG. 6 shows an illustrative example of another simulation process with an illustrative efficiency component. This is an example of a simulation process 129 that leverages verified completion data, such as that gathered in FIG. 5 and the like, to skip over simulation of certain location points indicated by the data snapshots. While not necessary to skip these, or any available points, this is an example of how the feedback process can be used to speed up the analysis process and reduce system overhead.

In this example, the process 129 receives a request for a simulation at 601. This can be similar to other requests, and the request may include parameters and vehicle characteristics. These may be extracted from the request at 603 and the process 129 may determine if at least some data is indexed for each of the characteristics. The data in the database 127 may be indexed with respect to a variety of characteristics, representing which characteristics have been verified based on at least one data snapshot from a vehicle operating under that characteristic. The step at 605 determines if at least one data snapshot has been indexed as verified to each characteristic, otherwise there will be no verified data for at least that one characteristic and the simulation can proceed under standard conditions at 201.

If there is at least some instance of verified data for each characteristic, the process 129 will then build the proposed route at 607. Because the mere existence of indexed data may not necessarily indicate that any snapshots along the proposed route have a verified status for that vehicle 100, the process may undertake the step 605, or another version, at a later point. For example, the process may first obtain the snapshots for the route at 609, and then determine if any have been verified for at least that vehicle.

This process may also be used as an efficiency accelerator for subsets of data in a snapshot, wherein certain data may not need to be modeled for the snapshot under certain conditions, even if other data is, which can also save simulation overhead. For example, if vehicles with sensor type and model X are considered to sufficiently sense what is needed for an instance, there may not need to be a model for the sensor data at such instances.

The process 129 compares the characteristics of the vehicle and parameters of the request to the data that has been verified as sufficient at the obtained data snapshot locations. Some data may be conditional and require an entire context to be met to be verified (e.g., traction control of a certain type is only verified under dry conditions when a load weight is under X), but other data may be verified as an independent element and thus modeling for those types may not be needed.

If there is a full match at 613 (e.g., the same vehicle or exactly same outfitted vehicle is present under the same context), the process may deliver the remaining data for analysis at 615 without the matching data, as the ability of the vehicle 100 to navigate the fully matching locations has already been confirmed. Even if the same vehicle or another vehicle with exactly the same system has been verified at the location under the same context, certain elements may still be modeled for that location to ensure the present functionality of the chosen vehicle, but in certain instances this may not be needed and so the full data snapshot may be exempted from the analysis.

If there is a partial match of data that can be extracted from the simulation at 613, the process 129 extracts the matching elements at 617 and delivers the remainder of the data for simulation. As noted, whether or not to exempt data may be a matter of choice, but the opportunity to exempt certain verified data is demonstrated by the illustrative embodiment. Full simulations may always present the most accurate projections, but matching data may indicate variables that are well within tolerances for a vehicle, if not for the exact same vehicle, and such data may not need to be simulated to generate sufficient assurance that the vehicle 100 will be able to navigate a given location or route.

For example, simulating a 10 foot wide passage for a 6 foot wide vehicle may be possible, but once it has been verified that 10,000 6 feet wide vehicles have passed through the passage without incident, that portion of the simulation may be avoided, if desired. On the other hand, a 6 foot wide vehicle with an unstable load or towing a trailer may need benefit more from a simulation, especially if the 10 foot wide passage is on uneven terrain and in weather conditions, and so context may also be relevant to determining whether or not to simulate a given element of matching data, even if that data has been generally verified.

The illustrative embodiments allow for use of data snapshots to build simulations and testing parameters to not only verify if a given candidate vehicle can or should be used for planned travel, but to simulate at least portions of a route in a manner that allows for consideration of how various vehicle systems and ECUs will respond to expected or known conditions represented by the data snapshots. This can also help verify if systems should be engaged or disengaged at a location and whether or not necessary systems or recommended systems are even present on the candidate vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
one or more processors configured to:
receive a request for an identified vehicle to complete a task;
determine at least one route usable to complete the task;
access a database of vehicle data snapshots to obtain one or more data snapshots for one or more identified portions of the at least one route;
simulate travel over at least the one or more identified portions, for the identified vehicle, including feeding data, based on a given of the one or more data snapshots corresponding to a given one of the one or more identified portions, into a vehicle sensor module to simulate module reaction to a route characteristic represented by the given data snapshot, to identify any risks that the identified vehicle may encounter over the one or more portions; and
based on the results of the comparing and evaluating, present any risks identified as likely to occur when using the identified vehicle to complete the task and traveling over at least the identified portions.

2. The system of claim 1, wherein the route is determined based at least on one or more restrictions included in the request.

3. The system of claim 1, wherein the characteristics of the vehicle include vehicle width and wherein the characteristics of at least one of the one or more identified portions include passage width.

4. The system of claim 1, wherein the characteristics of the vehicle include vehicle height and wherein the characteristics of at least one of the one or more identified portions include clearance.

5. The system of claim 1, wherein the one or more processors are configured to determine a new route around at least one identified portion, responsive to the results of the comparing and evaluating, for the at least one identified portion, indicating that the portion is impassible for the identified vehicle.

6. The system of claim 1, wherein the one or more processors are configured to determine a new route around at least one identified portion, responsive to the results of the comparing and evaluating, for the at least one identified portion, indicating a predefined undesirable vehicle reaction is likely, over a predefined threshold, to occur.

7. The system of claim 1, wherein the one or more processors are configured to provide a system change recommendation, applicable to at least one system of the identified vehicle, responsive to the comparing and evaluating, for at least one portion, indicating a preferred setting for the at least one system when the identified vehicle encounters the at least one identified portion.

8. The system of claim 1, wherein the one or more processors are configured to provide a vehicle travel mitigation action recommendation, applicable to at least one control system of the identified vehicle, responsive to the comparing and evaluating, for at least one identified portion, indicating a preferred travel characteristic, controllable through engagement of the at least one control system, for the at least one system when the identified vehicle encounters the at least one identified portion.

9. A system comprising:
one or more processors configured to:
receive a request to complete a task, the request including one or more parameters associated with the task;
determine a specific vehicle, from a plurality of available vehicles, to be used to complete the task, based on vehicle characteristics correlated to the one or more parameters and indicating that the vehicle is suitable to accommodate the one or more parameters
determine at least one route usable to complete the task;
access a database of vehicle data snapshots to obtain data snapshots for one or more identified portions of the at least one route;
simulate travel over at least the one or more identified portions, for the specific vehicle, including feeding data, based on a given of the one or more data snapshots corresponding to a given one of the one or more identified portions, into at least one of an actual sensor module of the specific vehicle or a simulated vehicle sensor module to simulate reaction of the respective sensor module or simulated sensor module to a route characteristic represented by the given data snapshot, to identify any risks that the specific vehicle may encounter over the one or more portions; and
based on the results of the comparing and evaluating, present any risks identified as likely to occur when using the specific vehicle to complete the task and traveling over at least the identified portions.

10. The system of claim 9, wherein the route is determined based at least on one or more restrictions included in the request as part of the parameters.

11. The system of claim 9, wherein the characteristics of the vehicle include vehicle width and wherein the characteristics of at least one of the one or more identified portions include passage width.

12. The system of claim 9, wherein the characteristics of the vehicle include vehicle height and wherein the characteristics of at least one of the one or more identified portions include clearance.

13. The system of claim 9, wherein the one or more processors are configured to determine a new route around at least one identified portion, responsive to the results of the comparing and evaluating, for the at least one identified portion, indicating that the identified portion is impassible for the identified vehicle.

14. The system of claim 9, wherein the one or more processors are configured to determine a new route around at least one identified portion, responsive to the results of the comparing and evaluating, for the at least one identified portion, indicating a predefined undesirable vehicle reaction is likely, over a predefined threshold, to occur.

15. The system of claim 9, wherein the one or more processors are configured to recommend selection of a new vehicle to replace the specific vehicle, responsive to the results of the comparing and evaluating, for the at least one identified portion, indicating a predefined undesirable vehicle reaction is likely, over a predefined threshold, to occur.

16. The system of claim 9, wherein the one or more processors are configured to selection of a new vehicle to replace the specific vehicle, responsive to the results of the comparing and evaluating, for the at least one portion, indicating that the identified portion is impassible for the identified vehicle.

17. The system of claim 9, wherein the one or more processors are configured to provide a system change recommendation, applicable to at least one system of the identified vehicle, responsive to the comparing and evaluating, for at least one identified portion, indicating a preferred setting for the at least one system when the identified vehicle encounters the at least one identified portion.

18. The system of claim 9, wherein the one or more processors are configured to provide a vehicle travel mitigation action recommendation, applicable to at least one control system of the identified vehicle, responsive to the comparing and evaluating, for at least one identified portion, indicating a preferred travel characteristic, controllable through engagement of the at least one control system, for the at least one system when the identified vehicle encounters the at least one identified portion.

19. A method comprising:
receiving a request for an identified vehicle to complete a task;
determining at least one route usable to complete the task;
accessing a database of vehicle data snapshots to obtain data snapshots for one or more identified portions of the at least one route;
simulating travel over at least the one or more identified portions, for the identified vehicle, including feeding data, based on a given of the one or more data snapshots corresponding to a given one of the one or more identified portions, into a vehicle sensor module of the identified vehicle to simulate module reaction to a route characteristic represented by the given data snapshot, to identify any risks that the identified vehicle may encounter over the one or more portions; and
based on the results of the comparing and evaluating, presenting any risks identified as likely to occur when using the identified vehicle to complete the task and traveling over at least the identified portions.

20. The method of claim 19, further comprising determining a new route around at least one portion, responsive to the results of the comparing and evaluating, for the at least one identified portion, indicating a predefined undesirable vehicle reaction is likely, over a predefined threshold, to occur.

* * * * *